(12) United States Patent
Kuroyanagi et al.

(10) Patent No.: US 11,890,155 B2
(45) Date of Patent: *Feb. 6, 2024

(54) DENTAL FILE

(71) Applicant: MANI, INC., Tochigi (JP)

(72) Inventors: Shinsaku Kuroyanagi, Tochigi (JP); Koichi Nabana, Tochigi (JP); Norio Maeda, Tochigi (JP)

(73) Assignee: MANI, Inc., Tochigi (JP)

( * ) Notice: Subject to any disclaimer, the term of this patent is extended or adjusted under 35 U.S.C. 154(b) by 301 days.

This patent is subject to a terminal disclaimer.

(21) Appl. No.: 17/185,134

(22) Filed: Feb. 25, 2021

(65) Prior Publication Data

US 2021/0177543 A1 Jun. 17, 2021

Related U.S. Application Data

(63) Continuation of application No. PCT/JP2019/033691, filed on Aug. 28, 2019.

(30) Foreign Application Priority Data

Aug. 29, 2018 (JP) .................. 2018-160563

(51) Int. Cl.
*A61C 5/42* (2017.01)
(52) U.S. Cl.
CPC ...................... *A61C 5/42* (2017.02)
(58) Field of Classification Search
CPC ....................................... A61C 5/42
See application file for complete search history.

(56) References Cited

U.S. PATENT DOCUMENTS

| 4,299,571 A | 11/1981 | McSpadden |
| 5,713,736 A | 2/1998 | Heath et al. |
| 5,735,689 A | 4/1998 | McSpadden |
| 5,897,316 A | 4/1999 | Buchanan |
| 5,902,106 A | 5/1999 | McSpadden |

(Continued)

FOREIGN PATENT DOCUMENTS

| CN | 1372871 A | 10/2002 |
| CN | 101677838 A | 3/2010 |

(Continued)

OTHER PUBLICATIONS

Chinese Office Action dated Jul. 21, 2022 for the corresponding Chinese Patent Application No. 201980055736.X.

(Continued)

*Primary Examiner* — Nicholas D Lucchesi
*Assistant Examiner* — Hao D Mai
(74) *Attorney, Agent, or Firm* — Pearne & Gordon LLP

(57) ABSTRACT

Provided is a dental file exhibiting high performance and having high flexibility and excellent root canal followability. A dental file (10) of the present invention includes a working portion (11) in a spiral shape. An outer edge of the sectional shape of the working portion (11) at any position includes a single arc (40) and three or more lines (41, 42, 43). One end of the arc (40) forms a first cutting blade. The three or more lines (41, 42, 43) are positioned inside a virtual circle (50) partially including the arc (40). The length of the arc (40) may be equal to or greater than $1/12$ and equal to or less than $1/3$ of the circumferential length of the virtual circle (50), or a second cutting blade (16) may be further provided inside the virtual circle (50).

5 Claims, 4 Drawing Sheets

A — A

(56) References Cited

U.S. PATENT DOCUMENTS

| | | | |
|---|---|---|---|
| 6,042,376 | A | 3/2000 | Cohen et al. |
| 8,647,116 | B2 | 2/2014 | Becker et al. |
| 9,066,773 | B2 | 6/2015 | Tetsuka et al. |
| 9,113,980 | B2 | 8/2015 | Rota et al. |
| 9,662,181 | B2 | 5/2017 | Scianamblo |
| 9,801,696 | B2 | 10/2017 | Rota et al. |
| 10,123,850 | B2 | 11/2018 | Rota et al. |
| 10,932,884 | B2 | 3/2021 | Rota et al. |
| 2002/0119418 | A1 | 8/2002 | Matsutani et al. |
| 2003/0199236 | A1 | 10/2003 | Aloise et al. |
| 2006/0014480 | A1 | 1/2006 | Aloise et al. |
| 2009/0117831 | A1 | 5/2009 | Matsutani |
| 2010/0173263 | A1 | 7/2010 | Tetsuka et al. |
| 2011/0212413 | A1 | 9/2011 | Becker et al. |
| 2012/0021376 | A1 | 1/2012 | Iwamoto et al. |
| 2013/0244200 | A1 | 9/2013 | Rota et al. |
| 2013/0337407 | A1 | 12/2013 | Mordeniz et al. |
| 2014/0329199 | A1 | 11/2014 | Becker et al. |
| 2015/0320517 | A1 | 11/2015 | Rota et al. |
| 2016/0067012 | A1 | 3/2016 | Breguet et al. |
| 2016/0128800 | A1 | 5/2016 | Kim et al. |
| 2018/0008374 | A1 | 1/2018 | Rota et al. |
| 2019/0046291 | A1 | 2/2019 | Rota et al. |
| 2021/0145540 | A1 | 5/2021 | Rota et al. |
| 2021/0145541 | A1 | 5/2021 | Kuroyanagi et al. |

FOREIGN PATENT DOCUMENTS

| | | |
|---|---|---|
| CN | 202437374 U | 9/2012 |
| CN | 104739525 A | 7/2015 |
| CN | 204446150 U | 7/2015 |
| CN | 104902841 A | 9/2015 |
| CN | 105377178 A | 3/2016 |
| CN | 206044757 U | 3/2017 |
| CN | 206239536 U | 6/2017 |
| CN | 206518609 U | 9/2017 |
| CN | 206910405 U | 1/2018 |
| CN | 209548113 U | 10/2019 |
| CN | 111936080 A | 11/2020 |
| EP | 0 902 661 B1 | 5/2004 |
| EP | 1 354 566 B1 | 7/2010 |
| EP | 2 645 959 B1 | 3/2017 |
| EP | 3 045 142 B1 | 8/2017 |
| JP | H08-56961 A | 3/1996 |
| JP | 2002-253578 A | 9/2002 |
| JP | 2002-537892 A | 11/2002 |
| JP | 2003-310640 A | 11/2003 |
| JP | 4247346 B2 | 4/2009 |
| JP | 2016-504142 A | 2/2016 |
| KR | 2010-0068505 A | 6/2010 |
| KR | 10-1569202 B1 | 11/2015 |
| KR | 101629143 B1 | 6/2016 |
| RU | 2012-139198 A | 3/2014 |
| WO | 00/51516 A1 | 9/2000 |
| WO | 02/062251 A2 | 8/2002 |

OTHER PUBLICATIONS

Office Action dated Jan. 21, 2022 for Korean Patent Application No. 10-2020-7029696.
Office Action dated Jan. 21, 2022 for corresponding Indian Patent Application No. 202127008526.
Office Action dated Sep. 13, 2022 for the Brazilian Patent Application No. BR1120200196827.
International Search Report dated Oct. 8, 2019 filed in PCT/JP2019/033691.
International Search Report dated Jun. 18, 2019 filed in PCT/JP2019/015702 in Related U.S. Appl. No. 17/044,890.
Office Action dated Mar. 10, 2022 for the corresponding Chinese Patent Application No. 201980055736.X.
Search Report dated Nov. 23, 2021 for European Patent Application No. 19785635.4.
Office Action dated Dec. 3, 2021 for Indian Patent Application No. 202027042938.
Office Action dated Mar. 6, 2021 for Iran Patent Application No. 139950140003006273 with partial English translation.
Office Action dated Apr. 2, 2021 for Russian Patent Application No. 2020134943.
Chinese Office Action dated Jun. 3, 2021 issued in Chinese Patent Application No. 201980024327.3.

DENTAL FILE

TECHNICAL FIELD

The present invention relates to a dental file used for expanding/cleaning a root canal in dental treatment.

BACKGROUND ART

There is a reamer or a file as a dental root canal cutting tool used for expanding or cleaning a root canal in dental treatment (see Patent Literature 1). The reamer is mainly for cutting the inside of the root canal by rotation, and the file is for cutting the inside of the root canal by rotation or back-forth movement in an axial direction.

A typical dental root canal cutting tool is made of stainless steel. However, in recent years, a highly-elastic nickel titanium product suitable for treatment of a root canal curved in a complicated shape has been sometimes used. Further, not only a manual type but also an electric type connected to a dental hand piece (an engine) upon use have been increasingly used as power. The electric type allows quick treatment.

FIG. 6 is a plan view of a general dental file. The dental file 100 described herein is connected to a dental hand piece upon use. The dental file 100 has a working portion 101 including a spiral cutting blade in a shape narrowing toward a tip end, a shaft 102 formed continuously to a back end of the working portion 101, and a gripping portion 103 formed continuously to a back end of the shaft 102 and attached to the dental hand piece.

In the general method for manufacturing the dental file described above, processing is first performed such that a portion to be the working portion is formed from a thin wire rod with a certain taper rate (e.g., $6/100$) by a centerless processing machine. Thereafter, a groove to be the cutting blade of the working portion is formed by a blade groove grinding machine. If processing is performed using a thick wire rod, the tapered portion to be the working portion and the groove to be the cutting blade can be technically formed at the same time. However, due to a great grinding amount and easy damage of a grinding stone, a method in which a thin wire rod is ground at two stages that the tapered portion is first formed and the cutting blade is subsequently formed is often employed. In the case of a nickel titanium dental file, the grinding stone is particularly vulnerable, and for this reason, such a dental file may be manufactured by the method in which the thin wire rod is ground at two stages.

For the dental file, performance allowing cutting while following a root canal curved in a complicated shape is required. That is, even when high cutting performance is exhibited, if flexibility is poor, the dental file cannot curve along a curved line of the root canal, but cuts the root canal in a straight-ahead direction. This might lead to a disadvantage that an uncut portion remains in the vicinity of a tip end of the root canal.

CITATION LIST

Patent Literature

Patent Literature 1: Japanese Patent No. 4247346

SUMMARY OF INVENTION

Problems to be Solved By Invention

In view of the above-described situation, the present invention is intended to provide a dental file having excellent flexibility while holding a moderate level of cutting performance so that high root canal following performance can be exhibited.

Solution to Problems

In order to achieve the object described above, a dental file according to the present invention includes a working portion in a spiral shape, in which an outer edge of a sectional shape of the working portion at any position includes a single arc and three or more lines, one end of the arc forms a first cutting blade, and the three or more lines are positioned inside a virtual circle partially including the arc. Further, it is preferred that a length of the arc is equal to or greater than $1/12$ and equal to or less than $1/3$ of a circumferential length of the virtual circle.

Further, a second cutting blade may be provided inside the virtual circle, or the spiral shape of the working portion may be configured such that a spiral pitch narrows toward a tip end.

Effects of Invention

The dental file of the present invention exhibits high performance and has high flexibility, and therefore, provides an effect that the dental file can cut even a root canal curved in a complicated shape while following the root canal.

DESCRIPTION OF EMBODIMENTS

Hereinafter, an embodiment of the present invention will be described with reference to the attached drawings.

Figure 1A:
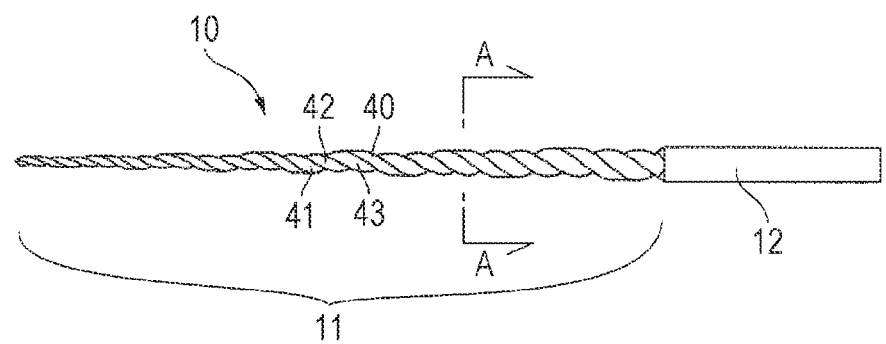
FIG. 1A is a plan view of a dental file.
Figure 1B:
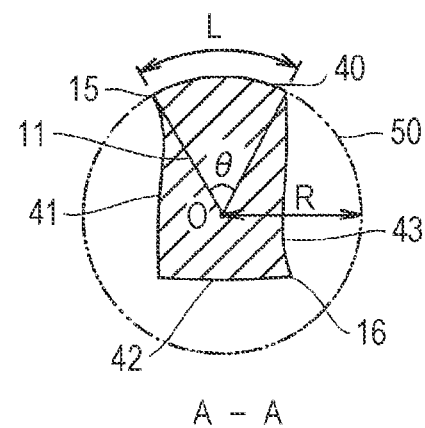
FIG. 1B is an enlarged A-A sectional view.

FIG. 1A is a plan view of a dental file of the present invention, and FIG. 1B is an enlarged A-A sectional view (a cross section taken across a longitudinal axis of the working portion).

The dental file 10 has a working portion 11 configured to cut a root canal, a shaft 12 formed continuously to a back end of the working portion 11, and a gripping portion (not shown) formed continuously to a back end of the shaft 12 and attached to a dental hand piece. The material of the dental file 10 may be highly-elastic nickel titanium suitable for treatment of the root canal curved in a complicated shape. The working portion 11 described herein is in a tapered shape of which section becomes smaller toward a tip end, and is configured such that similar sections are connected to each other in a spiral shape. The sectional shape of the working portion 11 at any position has a single arc 40 (hereinafter referred to as a "land").

The land 40 is in the arc shape, and therefore, a virtual (i.e., imaginary) circle 50 partially including the land 40 is present. That is, the land 40 is the arc on the circumference of the virtual circle 50, and the entirety of the working portion 11 other than the land 40 is within the virtual circle 50. For example, in a case where an outer edge of the sectional shape of the working portion 11 is in a substantially quadrangular shape formed by the land 40 and three lines 41, 42, 43, all of these three lines 41, 42, 43 other than the land 40 are inside the virtual circle 50. Note that the sectional shape inside the virtual circle 50 is basically the substantially quadrangular shape, but is not specifically limited. The sectional shape may be a shape other than the substantially quadrangular shape. That is, it may only be required that the outer edge of the sectional shape of the working portion 11 includes the single land 40 (the arc) and three or more lines. The shapes of the lines 41, 42, 43 are basically curved lines close to straight lines, but are not specifically limited. These shapes may be curved lines or straight lines. Note that in a case where the sectional shape of the working portion 11 is too small, strength against bending and rupture is insufficient, and for this reason, the sectional shape needs to be such a sectional shape that a certain level of strength can be ensured.

When the length L of the land 40 is too long, the area of contact with the root canal is large, and therefore, a resistance is high and the section is large. This might lead to a problem in flexibility. Conversely, when the land length L is too short, the sectional shape is small, and therefore, the strength is insufficient. For these reasons, the land length L may be a length of 1/12 to 1/3 of the circumferential length of the virtual circle 50. That is, when the radius of the virtual circle is R, the land length L is $2\pi R \times 1/12 \leq L \leq 2\pi R \times 1/3$. In other words, the center angle θ of the arc of the land 40 is equal to or greater than 30° and equal to or less than 120°. Note that the flexibility is very important, and therefore, the land length L may be preferably equal to or less than 2/7 of the circumferential length of the virtual circle 50. That is, the center angle θ is approximately equal to or less than 100°.

One end of the land 40 forms a first cutting blade 15 configured to cut the inside of the root canal. Moreover, a second cutting blade 16 may be, in addition to the first cutting blade 15, provided inside the virtual circle 50. The first cutting blade 15 described herein is outside the second cutting blade 16. Thus, the first cutting blade 15 greatly contributes to cutting performance of the dental file 10, and the second cutting blade 16 plays an auxiliary role. In an example of the section illustrated in FIG. 1B, an intersection between the lines 42, 43 forms the second cutting blade 16. Note that in some cases, no cutting blade is provided inside the virtual circle 50, and an intersection between the line 41 and the line 42 or the intersection between the line 42 and the line 43 inside the virtual circle 50 is rounded.

Figure 2A:
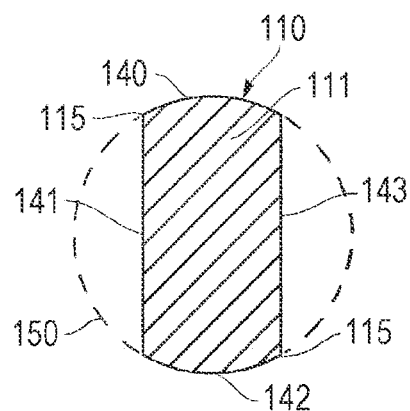
FIG. 2A illustrates the sectional shape of a working portion of a typical product and FIG. 2B illustrates the sectional shape of a working portion of the present invention.
Figure 2B:
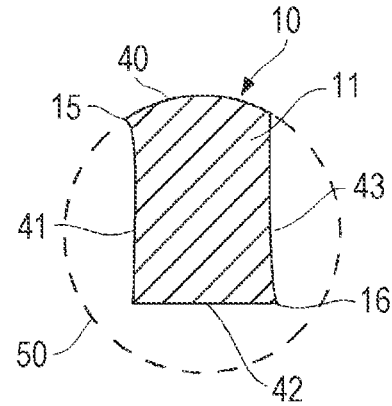

FIG. 2A illustrates the sectional shape of the working portions of a typical product, and FIG. 2B illustrates the sectional shape of the working portions of the present invention. The working portions in a substantially rectangular shape (the substantially quadrangular shape) as the most basic sectional shape are compared to each other. The sectional shape of the working portion 111 of the typical product is the substantially rectangular shape formed by substantially parallel lines 141, 143 and opposing lands 140, 142, and cutting blades 115 are formed at two locations on a virtual circle 150. On the other hand, the sectional shape of the working portion 11 according to the present invention is formed by the single land 40 and three lines 41, 42, 43, the first cutting blade 15 is only at a single location on the virtual circle 50, and the second cutting blade 16 is provided inside the virtual circle 50. Needless to say, the lines 41, 42, 43 may be straight lines.

As a result of comparison between the typical product and the present invention, a dental file 110 as the typical product configured such that the cutting blades 115 function at two locations basically exhibits higher cutting performance. However, the typical product has a large section and exhibits high cutting performance, and therefore, it is concerned that when a root canal curved in a complicated shape is cut, cutting is performed in a straight-ahead direction without following a root canal shape. On the other hand, in the dental file 10 of the present invention, the second cutting blade 16 is added to the first cutting blade 15, and therefore, a certain level of cutting performance is ensured while the section is smaller than that of the typical product. That is, the dental file 10 does not lead to excessive drilling and has excellent flexibility, and therefore, is configured to easily follow even the root canal curved in the complicated shape.

If the position of the second cutting blade 16 is too close to the virtual circle 50, the cutting performance is high. If the position of the second cutting blade 16 is too close to the center O of the virtual circle 50, almost no cutting performance is exhibited, and for this reason, there is no point in providing the cutting blade. For these reasons, it is assumed that the position of the second cutting blade 16 is preferably a position with a distance of 0.6 times to 0.8 times as great as the radius R of the virtual circle 50 from the center O of the virtual circle 50. Note that in a case where the first cutting blade 15 exhibits sufficient cutting performance, no second cutting blade is provided in some cases.

Figure 3A:
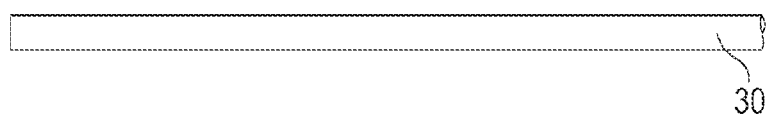
FIGS. 3A-3C illustrate views for describing the steps of manufacturing the dental file, FIG. 3A being a plan view of a wire rod, FIG. 3B being a plan view of a tapered member, and FIG. 3C being a plan view of the dental file.
Figure 3B:
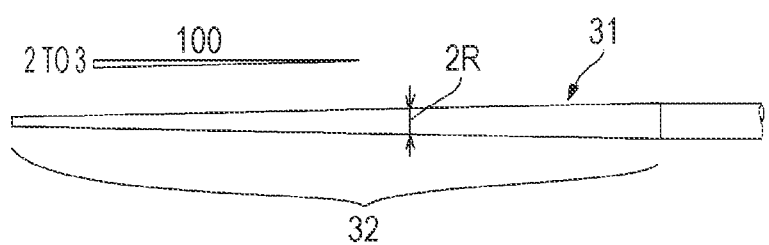
Figure 3C:
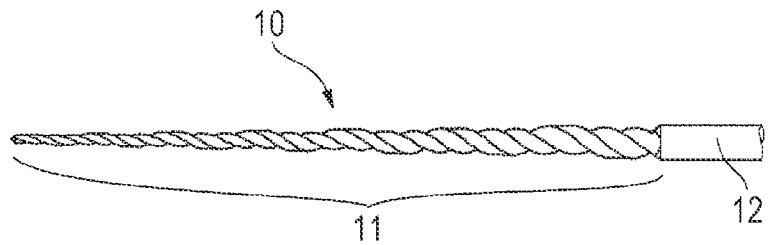

FIGS. 3A-3C illustrate views for describing the steps of manufacturing the dental file, FIG. 3A being a plan view of a wire rod, FIG. 3B being a plan view of a tapered member, and FIG. 3C being a plan view of the dental file. The working portion 11 of the dental file 10 is formed by the following manufacturing steps.

First, the wire rod 30 as a nickel titanium product is prepared. The section of the wire rod 30 is in a circular shape, and the length thereof is determined based on the length of the dental file 10 as a finished product. The nickel titanium product is used because such a product is a material rich in elasticity and easily follows even the root canal curved in the complicated shape.

Next, the wire rod 30 is ground, and in this manner, the tapered member 31 having a tapered portion 32 narrowing toward a tip end at a constant rate is formed. The tapered portion 32 is a portion to be the working portion 11 of the finished product, and therefore, is in a conical shape with a length and a taper rate corresponding to those of the working portion 11. Note that the sectional shape of the conical shape is the virtual circle 50. Assuming that the radius of the section of the tapered portion 32 at any position is R, the rate of change in a diameter 2R in an axial direction is the taper rate, and such a taper rate can be a predetermined value of 4/100 to 6/100 (an inclination on one side is 2/100 to 3/100), for example.

Finally, the tapered portion 32 is further ground such that the sectional shapes of FIG. 1B are connected to each other in the spiral shape. In this manner, the working portion 11 is formed. In the sectional shape of the working portion 11 as described herein, the land 40 is not ground such that a surface of the tapered portion 32 directly forms the land 40, and only a portion inside the virtual circle 50 is ground.

Figure 4A:
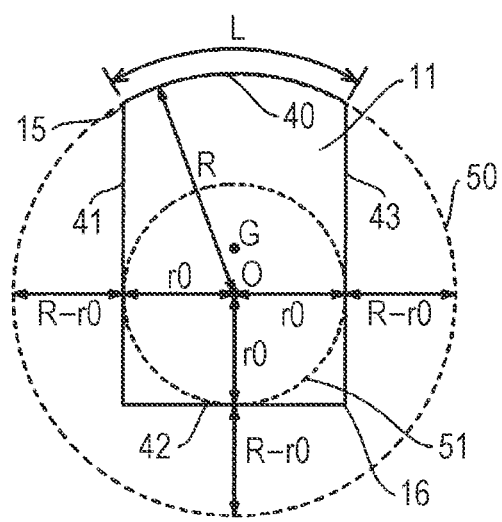
FIGS. 4A-4C illustrate views for describing the sectional shape of the dental file, FIG. 4A being a view of a core contacting three sides, FIG. 4B being a view of the core contacting one side, and FIG. 4C being a view of the core contacting two sides.
Figure 4B:
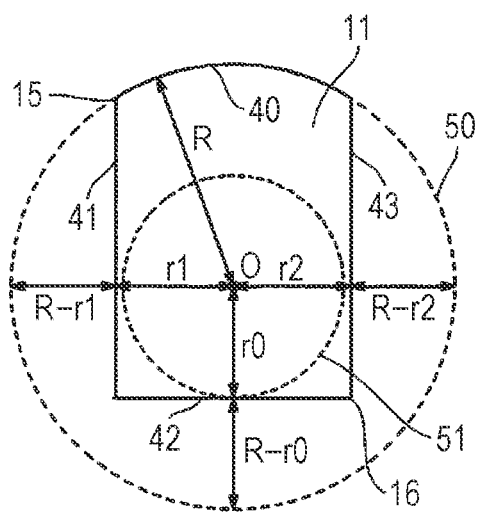
Figure 4C:
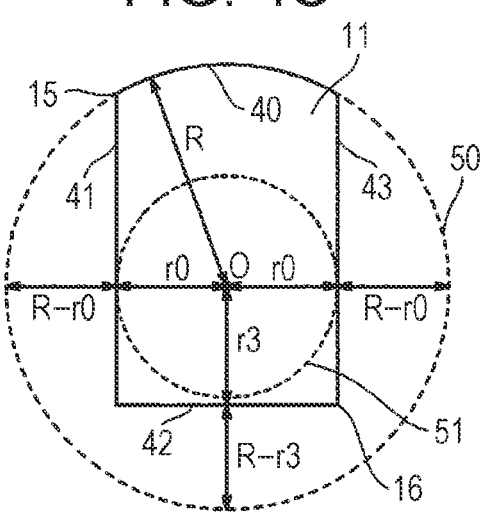

FIGS. 4A-4C illustrate views for describing the sectional shape of the dental file, FIG. 4A being a view of a core contacting three sides, FIG. 4B being a view of the core contacting one side, and FIG. 4C being a view of the core contacting two sides.

In the sectional view of the working portion 11, the land 40 is not ground such that the surface of the tapered portion 32 directly forms the land 40, and only portions corresponding to three lines 41, 42, 43 are ground and formed. The line 41 and the line 42 are perpendicular to each other, and the line 42 and the line 43 are perpendicular to each other. That is, the line 41 and the line 43 are parallel with each other, and the line 42 is perpendicular to any of the line 41 and the line 43. Moreover, an intersection between the line 41 and the land 40 forms the cutting blade 15, and therefore, for forming the cutting blade 15 with a great rake angle (a sharp rake angle), the line 41 is a slightly-curved line in some cases. Moreover, since the working portion 11 is in the spiral shape, it is difficult to grind the line 42 and the line 43 into perfect straight lines, and it is assumed that the line 42 and the line 43 are curved lines close to straight lines. Thus, in some cases, the line 41 and the line 43 are not completely parallel with each other, and an angle between the line 42 and the line 41 and an angle between the line 42 and the line 43 are not 90°. Note that these lines are gently-curved lines, and therefore, it may be assumed that the outline of the sectional shape of the working portion 11 is the substantially rectangular shape. Thus, the lines 41, 42, 43 will be described below as straight lines.

It is assumed that the axial center position of the tapered member 31 is O and the radius of the tapered portion 32 in the section at any position is R. Moreover, it is assumed that in the dental file 10 as the finished product, a circle with the radius R about the axial center position O is the virtual circle 50. That is, the land 40 is part of the virtual circle 50, and therefore, points at both ends of the land 40 are on the virtual circle 50. Moreover, the axial center position O is the center position O of the virtual circle 50, and needless to say, the center position O is positioned inside the substantially rectangular shape as the sectional shape of the working portion 11.

A distance from the center position O of the virtual circle 50 to each of three lines 41, 42, 43 is the length of a line extending perpendicularly to each of three lines 41, 42, 43 from the center position O. Assuming that the length of a shortest one of these perpendicular lines is r0, a circular portion with the radius r0 about the center position O is a portion formed continuously across the entire length of the working portion 11 in the spiral shape, and is the core 51 of the dental file 10. Note that the radius r0 decreases toward a tip end of the dental file 10, and therefore, the core 51 is in a conical shape narrowing toward a tip end.

FIG. 4A is the view in a case where the lengths of the lines perpendicular to the lines 41, 42, 43 are equal to each other. In other words, FIG. 4A is the view in a case where the core 51 contacts the lines 41, 42, 43 as three sides of the section of the working portion 11. Thus, the section of the working portion 11 is formed in such a manner that the circular section of the tapered portion 32 is ground from three directions by a depth of R-r0. As described above, if the lengths of the perpendicular lines are equal to each other, grinding amounts are also equal to each other, therefore, it is only required that the same grinding program is repeated three times with the rotation by 90° before the subsequent grinding programs. Thus, manufacturing can be simplified. Such manufacturing simplification can contribute to mass production and quality stability. Note that description has been made based on the case where the lengths of the perpendicular lines are equal to each other, but the lengths of the perpendicular lines can be different values.

FIG. 4B is the view in a case where the length r0 of the line perpendicular to the line 42 is shortest. In other words, FIG. 4B is the view in a case where the core 51 contacts only the line 42 as one side of the section of the working portion 11.

Assuming that the lengths of the perpendicular lines other than r0 are r1 and r2, r0<r1 and r0<r2 are satisfied, and in some cases, r1=r2 is satisfied. Note that although not shown in the figure, the line that the core 51 contacts is the line 41 or the line 43 in some cases, and in this case, the position of the shortest perpendicular line varies. Moreover, the section of the working portion 11 is formed in such a manner that the circular section of the tapered portion 32 is ground from three directions by depths of R-r0, R-r1, and R-r2.

FIG. 4C is the view in a case where the lengths r0 of the lines perpendicular to the lines 41, 43 are shortest. In other words, FIG. 4C is the view in a case where the core 51 contacts the lines 41, 43 as two sides of the section of the working portion 11. Note that although not shown in the figure, two sides that the core 51 contacts may be the line 41 and the line 42 or the line 42 and the line 43. Moreover, the section of the working portion 11 is formed in such a manner that the circular section of the tapered portion 32 is ground from three directions by depths of R-r0, R-r0, and R-r3.

Note that the case of the sectional shape of the dental file illustrated as an example in FIGS. 4(a), 4(b), and 4(c) has the following features. First, in a case where the section is cut along a line connecting the center position O of the virtual circle 50 and the center of the land 40, cut portions are symmetrical to each other. That is, the lengths of diagonal lines of the sectional shapes are equal to each other. Moreover, the lines 41, 43 adjacent to the land 40 are parallel with each other, and the lines 41, 43 adjacent to the land 40 and the line 42 facing the land 40 cross perpendicularly to each other. A virtual line connecting end portions of the land 40 are parallel with the line 42 facing the land 40.

The position G of the center of gravity of the section of the working portion 11 shifts from the center position O of the virtual circle 50. Such a state is called off-center. The dental file 10 of the present invention is off-centered, and therefore, is characterized in that the dental file 10 has excellent flexibility and fracture resistance and exhibits favorable cutting-piece discharging performance to smoothly cut the root canal.

As a result of a root canal followability test for the typical product 110 and the dental file 10 of the present invention having the sectional shapes illustrated in FIG. 2B, it has been found that the dental file 10 of the present invention can more equally cut a root canal wall as compared to the dental file 110 as the typical product, and therefore, the dental file 10 of the present invention has better root canal followability. It is assumed that as reasons for such a result, the section of the working portion 11 according to the present invention has higher flexibility due to a smaller second moment of area than that of the typical product and there is a greater clearance between the working portion and the root canal wall as compared to the typical product due to the land at the single location and the off-centered section. Thus, it is assumed that the dental file 10 of the present invention has such a structure that the dental file 10 easily follows even the root canal shape curved in, e.g., an S-shape. Further, the dental file 10 of the present invention has the land with a moderate length, and can moderately cut the root canal by the first cutting blade 15 on the virtual circle without excessively drilling the root canal. In addition, at a curved portion of the root canal, the second cutting blade 16 functions as a cutting blade configured to softly contact the root canal wall to gently drill the root canal wall. Thus, it is assumed that even the wall of the root canal curved in, e.g., the S-shape can be equally cut.

Figure 5A:
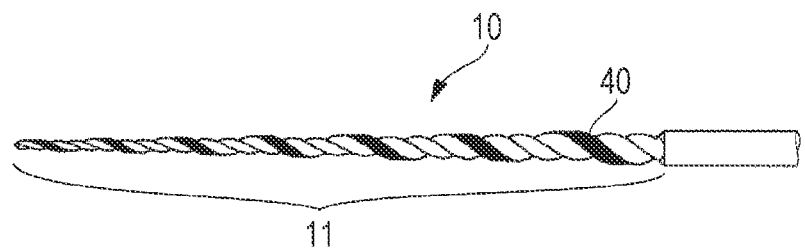
FIGS. 5A and 5B illustrate views for comparison among different spiral pitches of the working portion, FIG. 5A illustrating a dental file with equal pitches and FIG. 5B illustrating a dental file with pitches narrowing toward a tip end.
Figure 5B:
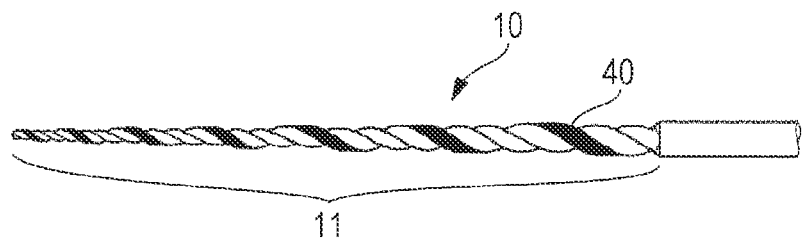
Figure 6:
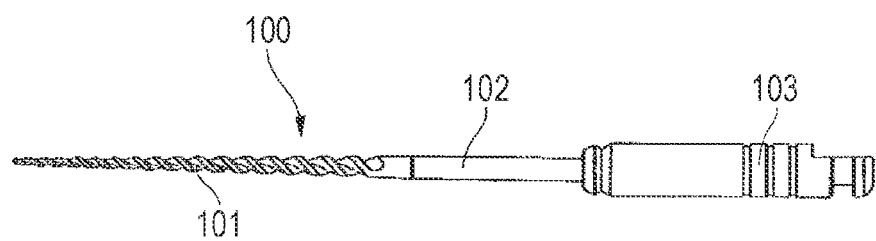
FIG. 6 is a plan view of a general dental file.

For obtaining a dental file with much better performance, performance comparison was made among different spiral pitches of the working portion. FIGS. 5A and 5B illustrate views for comparison among the different spiral pitches of the working portion, FIG. 5A illustrating a dental file with equal pitches and FIG. 5B illustrating a dental file with pitches (hereinafter referred to as a "front-narrower pitch") narrowing toward a tip end. Note that for clarifying the pitch, visible portions of the land 40 are illustrated as black. The dental file with the equal pitches is configured such that all pitches are the same as each other, but the dental file with the front-narrower pitches is configured such that the pitch narrows toward the tip end. Note that contrary to FIG. 5B, a product configured such that a pitch expands toward a tip end is also conceivable. However, in this case, strength in the vicinity of the tip end is weak and deformation is easily caused, and for this reason, such a product is excluded from comparison targets.

As a comparison test, a screwing test for estimating the force of moving the working portion 11 to a root apex and comparison of a lifting load when the working portion 11 is pulled out of the root canal were conducted. As a result, the force of moving the working portion 11 to the root apex was at the substantially same level even with different pitches, but the lifting load was lower in the case of the front-narrower pitch. It is assumed that this is because the root-side pitch of the working portion 11 is greater in the case of the front-narrower pitch and therefore, the rake angle of the cutting blade 15 decreases and is obtuse with respect to the root canal wall and resistance decreases.

Thus, it has been found that for further enhancing the performance of the dental file 10, it is effective to decrease the spiral pitch toward the tip end.

As described above, the dental file of the present invention exhibits sufficient cutting performance and has high flexibility, and therefore, can exhibit performance with excellent root canal followability. Moreover, the dental file also exhibits favorable cutting-piece discharging performance. Further, the spiral pitch is changed so that the dental file with higher performance can be provided.

LIST OF REFERENCE SIGNS

10 dental file
11 working portion
12 shaft
15 first cutting blade
16 second cutting blade
30 wire rod
31 tapered member
32 tapered portion
40 arc (land)
50 virtual circle
R virtual circle radius
L land length

The invention claimed is:

1. A dental file comprising:
a working portion in a spiral shape comprising:
   a cross section that is substantially perpendicular to a longitudinal axis of the working portion at any position from a back end of the working portion to a tip end of the working portion in a direction parallel to the longitudinal axis of the working portion,
   the cross section comprising a single arc of an imaginary circle and three or more sides,
   one end of the arc being a first cutting blade, and
   the three or more sides being positioned inside the imaginary circle,
wherein no vertex defined by any two of the three or more sides is positioned on the imaginary circle.

2. The dental file according to claim 1, wherein a length of the arc is equal to or greater than $1/12$ and equal to or less than $1/3$ of a circumferential length of the imaginary circle.

3. The dental file according to claim 1, wherein a second cutting blade is provided inside the imaginary circle.

4. The dental file according to claim 1, wherein the spiral shape of the working portion is configured such that a spiral pitch narrows toward a tip end.

5. A dental file comprising:
a working portion in a spiral shape comprising:
   a cross section that is substantially perpendicular to a longitudinal axis of the working portion at any position from a back end of the working portion to a tip end of the working portion in a direction parallel to the longitudinal axis of the working portion,
   the cross section comprising a single arc of an imaginary circle and three or more sides,
   one end of the arc being a first cutting blade, and
   the three or more sides being positioned inside the imaginary circle,
wherein all intersections of any adjacent two sides of the three more sides are positioned inside the imaginary circle.

* * * * *